(12) United States Patent
Spigaroli

(10) Patent No.: US 11,084,259 B2
(45) Date of Patent: Aug. 10, 2021

(54) COEXTRUDED MULTILAYER FILM

(71) Applicant: Cryovac, LLC, Charlotte, NC (US)

(72) Inventor: Romano Spigaroli, Legnano (IT)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/954,605

(22) PCT Filed: Dec. 20, 2018

(86) PCT No.: PCT/EP2018/086370
§ 371 (c)(1),
(2) Date: Jun. 17, 2020

(87) PCT Pub. No.: WO2019/122228
PCT Pub. Date: Jun. 27, 2019

(65) Prior Publication Data
US 2020/0331243 A1 Oct. 22, 2020

(30) Foreign Application Priority Data
Dec. 22, 2017 (EP) .................................... 17210369

(51) Int. Cl.
B32B 27/08 (2006.01)
B32B 27/18 (2006.01)
B32B 27/30 (2006.01)
B32B 27/32 (2006.01)
B32B 27/36 (2006.01)

(52) U.S. Cl.
CPC ............. *B32B 27/08* (2013.01); *B32B 27/18* (2013.01); *B32B 27/308* (2013.01); *B32B 27/32* (2013.01); *B32B 27/36* (2013.01); *B32B 2250/03* (2013.01); *B32B 2250/04* (2013.01); *B32B 2250/05* (2013.01); *B32B 2250/24* (2013.01); *B32B 2255/10* (2013.01); *B32B 2264/0264* (2013.01); *B32B 2264/1021* (2020.08); *B32B 2270/00* (2013.01); *B32B 2307/31* (2013.01); *B32B 2307/412* (2013.01); *B32B 2307/518* (2013.01); *B32B 2307/736* (2013.01); *B32B 2307/746* (2013.01); *B32B 2323/046* (2013.01); *B32B 2323/10* (2013.01); *B32B 2333/12* (2013.01); *B32B 2367/00* (2013.01); *B32B 2439/40* (2013.01); *B32B 2439/70* (2013.01); *B32B 2439/80* (2013.01)

(58) Field of Classification Search
CPC ............ B32B 2250/03; B32B 2250/04; B32B 2250/05; B32B 2250/24; B32B 2255/10; B32B 2255/24; B32B 2264/0264; B32B 2264/1021; B32B 2270/00; B32B 2307/31; B32B 2307/412; B32B 2307/514; B32B 2307/518; B32B 2307/736; B32B 2307/746; B32B 2323/046; B32B 2323/10; B32B 2333/12; B32B 2367/00; B32B 2439/40; B32B 2439/70; B32B 2439/80; B32B 27/08; B32B 27/18; B32B 27/30; B32B 27/308; B32B 27/32; B32B 27/36
See application file for complete search history.

(56) References Cited

U.S. PATENT DOCUMENTS

| | | |
|---|---|---|
| 4,322,465 A | 3/1982 | Webster |
| 6,406,763 B1 | 6/2002 | Wolf et al. |
| 6,607,834 B2 | 8/2003 | Davis et al. |
| 2008/0138474 A1 | 6/2008 | Murray |
| 2009/0116768 A1 | 5/2009 | Huerta et al. |
| 2011/0091695 A1 | 4/2011 | Bevilacqua et al. |
| 2012/0003429 A1 | 1/2012 | Iwasaki et al. |
| 2016/0046105 A1 | 2/2016 | Markowski et al. |
| 2017/0066228 A1 | 3/2017 | Fusarpoli et al. |

FOREIGN PATENT DOCUMENTS

| | | |
|---|---|---|
| EP | 0802046 A2 | 10/1997 |
| EP | 2361749 A1 | 8/2011 |
| JP | 2006052312 A | 2/2006 |
| JP | 2008138474 A | 6/2008 |
| WO | 2011124926 A2 | 10/2011 |

*Primary Examiner* — Lawrence D Ferguson
(74) *Attorney, Agent, or Firm* — Jason R. Womer

(57) ABSTRACT

The invention discloses a heat sealable multilayer polyester based film that form hermetic and peelable seals onto polyester containers and their use in food packaging.

12 Claims, No Drawings

COEXTRUDED MULTILAYER FILM

TECHNICAL FIELD

The present invention relates to a new coextruded multilayer film suitable for tray lidding applications on polypropylene or polyethylene containers or on containers having a heat sealable layer made of polypropylene or polyethylene.

BACKGROUD ART

Packaging systems comprising a rigid heat-stable container covered with a lid made of a thin flexible thermoplastic film sealed are commonly used for food products, in particular for ovenable or case-ready products such as meat, freshly cooked food, vegetables, ready to cook meals, and the like. The lidding films used in this type of packaging are heat sealed to the container. Polypropylene or polyethylene containers for tray lidding applications are widespread in the market and of particular interest due to their high mechanical strength, low cost, excellent optical properties and thermal stability.

The sealing of the lidding film to the container should be sufficiently strong to close the container hermetically and avoid accidental removal of the lid, leakage of material from the container to the exterior as well as any contamination of the product contained in the packaging during storage and distribution. However, on the other side, the removal of the lid should not require an excessive force or cause tearing of the film. The composition of the film should therefore be carefully designed in order to correctly balance tightness of the package and peelability of the seal.

It is also desirable that the sealing layer has a composition that allows the film to seal to the container at a temperature sufficiently low to ensure a fast packaging line speed and to avoid interfering with the quality of the packaged food and creating any distortions in the containers.

In order to satisfy the above requirements, laminate films are usually employed as lidding films for polypropylene or polyethylene containers since they allow a more flexible combination of the layers of the films and thus an easier modulation of the properties of the film.

However, laminate films are produced by multi step and time consuming processes.

Coextrusion is a simpler one-step process compared to lamination. However, it presents more constrains and thus requires a fine balancing of the composition of the different layers of the film in order to obtain suitable properties.

SUMMARY OF THE INVENTION

The present inventors have now developed a coextruded multilayer film suitable to be used as a lidding film on polypropylene or polyethylene containers. The film forms a strong and peelable seal on the containers. Furthermore, the film has excellent optical properties and starts sealing at a very low sealing temperature.

Accordingly, a first object of the present invention is a heat sealable, coextruded multilayer film comprising at least the following layers:

1) an outer heat sealable layer comprising at least 90 wt % preferably at least 95 wt %, more preferably at least 98 wt %, more preferably at least 99 wt %, even more preferably 100 wt % of a composition consisting of:
   a) between 20 and 100 wt % of one or more propylene copolymers and one or more antiblock agents and/or slip agents, and
   b) between 0 and 80 wt % of one or more ethylene alpha olefin copolymers;
2) an inner layer comprising at least at least 95 wt %, preferably at least 98 wt %, more preferably at least 99 wt %, even more preferably 100 wt % of one or more polymers selected from ethylene (meth)acrylate or ethylene (meth)acrylic acid copolymers, anhydride modified ethylene (meth)acrylate or anhydride modified ethylene (meth)acrylic acid copolymers, anhydride modified anhydride modified ethylene alpha olefin copolymers and mixtures thereof;
3) a polyester based layer;
wherein layer 2 adheres to layer 1 and to layer 3.

A second object of the invention is a package comprising a container, preferably a tray, a product placed onto/into the container, and a lid made of the film according to the first object of the present invention hermetically sealed onto said container, thus enclosing the product, wherein the heat sealable layer of the film is in contact with or faces the product.

A third object of the present invention is the use of the film according to the second object of the invention for packaging food.

DEFINITIONS

The term "polyester" is used herein to refer to both homopolyesters and copolyesters.

The term "homopolyesters" refers to polymers obtained from the condensation of one dicarboxylic acid with one diol. Suitable homo-polyester resins are, for instance, polyesters of ethylene glycol and terephthalic acid, i.e. poly (ethylene terephthalate) (PET).

The term "copolyesters" refers to polymers obtained from the condensation of at least one dicarboxylic acid with at least two different diols or at least two different dicarboxylic acids with at least one diol.

The dicarboxylic acid may be aliphatic dicarboxylic acids, among which the ($C_3$-$C_{19}$)alkanedioic acids are particularly suitable, in particular succinic acid, sebacic acid, adipic acid, azelaic acid, suberic acid or pimelic acid; cycloaliphatic dicarboxylic acids, among which succyclohexanedicarboxylic acids (in particular cyclohexane-1,4-dicarboxylic acid) are preferred; aromatic dicarboxylic acids such as terephtalic acid, isophthalic acid, phtalic, acid, naphthalic acid, or 2,5-, 2,6- or 2,7-naphthalenedicarboxylic acid.

Preference is given to polyesters that contain ethylene units and include, based on the dicarboxylate units, at least 90 mol %, more preferably at least 95 mol %, of terephthalate units. The remaining monomer units are selected from other dicarboxylic acids or diols.

The diols may be straight chained or branched. These may be, for example, aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings Examples of suitable copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid.

As used herein, the expression "a polyester based film or a polyester based layer" refers to a film or a film layer, respectively, substantially made of polyesters.

As used herein the expression "a layer substantially made of polyesters" refers to a film layer made for at least 60%, 70%, 80%, 90% buy weight of polyesters, including homopolyesters or copolyesters as previously defined or their admixtures.

As used herein the expression "amorphous" referred to a polyester refers to a polyester with an absence of a regular three-dimensional arrangement of molecules or subunits of molecules extending over distances, which are large relative to atomic dimensions. However, regularity of structure may exist on a local scale (see "Amorphous Polymers" in Encyclopedia of Polymer Science and Engineering, 2nd Ed pp 789-842, J. Wiley & Sons Inc 1985). In particular, the term refers to a polyester having no measurable melting point (less than 0.5 cal/g) by differential scanning calorimetry (DSC) or no heat of fusion as measured by DSC using for example ASTM 3417-83. The term also includes polyesters that are obtained and marketed under a (semi)crystalline form but become amorphous after they are heated during extrusion, such as for instance Eastobond 19412 by Eastman Chemical. Suitable amorphous polyesters are those derived from an aliphatic diol and a cycloaliphatic diol with one or more, dicarboxylic acid(s), preferably an aromatic dicarboxylic acid, for example copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

As used herein the expression "(semi)crystalline polyester" refers to a polyester that does not fall within the above definition of amorphous polyester and which has a measurable melting point (measured by DSC using ASTM 3418).

As used herein the term "polypropylene" refers to homopolymers and copolymers of propylene.

As used herein the term "copolymers of propylene" or "propylene copolymers" refers to co- or ter-polymers comprising a major portion of propylene and a minor proportion of one or two olefins copolymerized therewith. The term specifically includes propylene/butane, propylene/ethylene and propylene/ethylene/butene copolymers.

As used herein the term "polyethylene" refers to homopolymers and copolymers of ethylene.

As used herein the terms "ethylene alpha olefin copolymer" identify copolymers of ethylene, comprising a major portion of ethylene and a minor proportion of one or more alpha-olefins comonomers, preferably (C4-C10)-alpha-olefins, such as 1-butene, 1-hexene and/or 1-octene. Depending on the composition in monomers and polymerization process employed, polymers with a different degree of branching and a different density can be obtained. For example, the above term include polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, and very low and ultra low density polyethylene (VLDPE and ULDPE) with a density lower than about 0.915 g/cc, typically in the range 0.868 to 0.915 g/cc.

As used herein, the term "ethylene (meth)acrylate or ethylene (meth)acrylic acid copolymer" refers to a copolymer of ethylene with (meth)acrylate esters or (meth)acrylic acid.

As used herein, the term "copolymer of ethylene with (meth)acrylate esters" refers to a copolymer of ethylene with methacrylate or acrylate esters. For example, the term include ethylene ethyl (meth)acrylate co-polymer, ethylene butyl (meth)acrylate co-polymer, ethylene methyl (meth)acrylate co-polymer and the like. The copolymer typically contains between 15 to 40%, preferably about 20% by weight of acrylate or methacrylate units.

As used herein, the term "copolymer of ethylene with (meth)acrylic acid" refers to a copolymer of ethylene with acrylic or methacrylic acid.

As used herein the term "anhydride modified ethylene alpha olefin copolymer" or "anhydride modified ethylene methacrylate copolymer" refers to such polymers having an anhydride functionality associated therewith, either grafted onto the polymer or copolymerised therewith. The anhydride functionality can be an anhydride of maleic acid, crotonic acid, citraconic acid, itaconic acid, fumane acid, etc., and is inclusive of derivatives of such functionalities, such as acids, esters, and metal salts derived therefrom.

As used herein, the expression "heat sealable layer", refer to the outer layer of the film involved in the heat sealing of the film to a thermoplastic container, as herein defined.

As used herein, the term "extrusion" is used with reference to the process of forming continuous shapes by forcing a molten thermoplastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more molten thermoplastic materials through a single die with two or more orifices arranged so that the extrudates merge and weld together into a laminar structure before chilling, i.e., quenching. Coextrusion can be employed in film blowing and extrusion coating processes.

The term "coextruded multilayer film" refers to film obtained by coextrusion of the different layers forming it.

As used herein, the term "peelable seal" refers to a seal between a lidding film and a container which is strong enough to guarantee hermeticity of a package during its life-cycle but allows opening of the package by hand with separation of the two materials that were joined by the seal The opening of the package requires applying a moderate force to separate manually the lid from the container.

As used herein, the term "container" refers to any hollow rigid object suitable for supporting and containing a product, preferably a tray. The container is optionally provided with a sealing area around the perimeter of the opening of the container, a rim or a at least around the perimeter of the opening of the container, such as a sealing flange, suitable for being sealed to the heat sealable layer of a film forming the lid of the container.

As used herein "polypropylene or polyethylene containers" refers to a container made of propylene or polyethylene or having a sealing area made of polypropylene or polyethylene, respectively.

As used herein, the term "lidding film" refers to a film that closes the opening of a rigid container. Usually, the lidding film is sealed at a sealing area around the perimeter of the opening of the container.

As used herein, the phrases "corona treatment" and "corona discharge treatment" refer to subjecting one or both the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein the expression "antiblock agents" refers to inorganic compounds that, when added to the outer layer of a film, reduce the adhesion force of the surface of that film to film surfaces that come into contact with it. Antiblock agents are well known additives and include minerals such as for example, talc, calcined kaolin, cristobalite, natural or synthetic silica (silicone dioxide), alumina-silicate ceramic, aluminum silicate, calcium carbonates, calcium sulfate (anhydrite), magnesium carbonate, magnesium sulfate, and aluminum potassium silicate. These should have little to no impact on the mechanical properties of the film, must not deteriorate transparency, haze, color, gloss of the film and should be compatible with the film-processing process.

As used herein the expression "slip agents" refers to organic compounds, also known as release agents, that, when added to the outer layer of a film, are able to migrate to the film surface and decrease the friction between the surface of that film and film surfaces that come into contact with it. Slip agents are well known additives and include amides such as ethylene bis-stearamide, stearyl erucamide, erucamide, stearamide, organic stearate such as glycerol monostearate, metallic stearate, and silicones.

As used herein, the phrases "orientation" refers to the "solid state orientation", namely to the process of stretching of the cast film carried out at a temperature higher than the Tg (glass transition temperatures) of all the resins making up the layers of the structure and lower than the temperature at which all the layers of the structure are in the molten state. The solid state orientation may be mono-axial, transverse or, preferably, longitudinal, or, preferably, bi-axial.

The phrase "orientation ratio in machine or longitudinal direction" refers to the number of times the film has been oriented in that direction in relation to its original size. For example, if a film has been oriented to three times its original size in the longitudinal direction, the orientation ration in longitudinal direction is 3:1.

As used herein the phrases "heat-shrinkable," "heat-shrink," and the like, refer to the tendency of the solid-state oriented film to shrink upon the application of heat, such that the size of the film decreases while the film is in an unrestrained state.

As used herein, the phrase "longitudinal direction" or "LD" or "MD" (machine direction), refer to a direction "along the length" of the film, i.e., in the direction of the film as the film is formed during coextrusion.

As used herein, the phrase "transverse direction" or "TD", refers to a direction across the film, perpendicular to the machine or longitudinal direction.

As used herein, the term "layer" refers to a single layer of the film, having a substantial homogenous polymeric composition within it.

DETAILED DESCRIPTION OF INVENTION

A first object of the present invention is a heat sealable, coextruded multilayer film comprising at least the following layers:

1) an outer heat sealable layer comprising at least 90 wt %, preferably at least 95 wt %, more preferably at least 98 wt %, more preferably at least 99 wt %, even more preferably 100 wt % of a composition consisting of:
   a) between 20 and 100 wt % of one or more propylene copolymers and one or more antiblock agents and/or slip agents;
   b) between 0 and 80 wt % of one or more ethylene alpha olefin copolymers;
2) an inner layer comprising at least 95 wt %, preferably at least 98 wt %, more preferably at least 99 wt %, even more preferably 100 wt % of one or more polymers selected from ethylene (meth)acrylate or ethylene (meth)acrylic acid copolymers, anhydride modified ethylene (meth)acrylate or anhydride modified ethylene (meth)acrylic acid copolymers, anhydride modified ethylene alpha olefin copolymers and mixtures thereof,
3) a polyester based layer;
wherein layer 2) adheres to layer 1) and to layer 3).

The film of the invention may have 3 or more layers, preferably between 3 and 10, more preferably between 3 and 6, even more preferably 4.

The total thickness of the film of the invention may vary within wide limits. It is preferably between 3 and 150 microns, preferably between 10 and 100 microns, more preferably between 20 and 70 microns, more preferably between 30 and 60 microns, even more preferably of 40 microns.

Preferably, the heat sealable layer 1) has a thickness comprised between 1 and 15 microns, preferably between 3 and 12 microns, more preferably between 4 and 8 microns.

Preferably, layer 2) has a thickness comprised between 1 and 20 microns, preferably between 2 and 15 microns, more preferably between 3 and 10 microns, even more preferably between 3 and 8 microns.

Preferably, layer 3) has a thickness comprised between 5 and 60 microns, more preferably between 10 and 40 microns, even more preferably between 15 and 30 microns.

The film according to the invention may be heat shrinkable or not. Preferably the film is non heat shrinkable.

Preferably, when the film is heat shrinkable, it has a percentage of free shrink at 120° C. lower than 10%, preferably lower than 7%, more preferably lower than 5%, more preferably lower than 2%, even more preferably lower than 1% in longitudinal and/or transverse direction, measured in oil according to ASTM D 2732.

The non heat shrinkable film or the heat shrinkable film according to the above preferred embodiment has the advantage that it can be advantageously used both in inside or outside cut packaging methods.

When the film of the invention is oriented, it is preferably biaxially oriented, with an orientation ratio preferably comprised between 2:1 and 5:1, more preferably between 2:1 and about 4:1, even more preferably of 3.8:1 in in both longitudinal and transverse direction.

According to one preferred embodiment, said composition of layer 1) consists of only one or more propylene copolymers and one or more antiblock agents and/or slip agents (component a) above).

The films according to this embodiment are suitable to be sealed to containers made of polypropylene homopolymers and copolymers or on containers having a heat sealable area made of polypropylene homopolymers and copolymers.

According to an alternative preferred embodiment, said composition of layer 1) consists of an amount between 25 and 99 wt %, more preferably between 30 and 50 wt %, more preferably between 30 and 40 wt %, even more preferably of 35 wt % of one or more propylene copolymers and one or more antiblock agents and/or slip agents (component a) above), and an amount between 1 and 80 wt %, preferably between 20 and 70 wt %, more preferably between 60 and 70 wt %, even more preferably of 60 wt % of one or more ethylene alpha olefin copolymers (component b) above).

The films according to this second embodiment are suitable to be used for tray lidding applications on polypropylene or polyethylene containers or on containers having a heat sealable area of polypropylene or polyethylene.

Said propylene copolymers of component a) of said composition of layer 1) are preferably selected from copolymers of propylene with ethylene and/or butene, preferably propylene/ethylene/butene copolymers and propylene/ethylene copolymers and mixtures thereof. More preferably, said propylene copolymers are propylene/ethylene/butene copolymers.

Preferably, component a) of said composition of layer 1) comprises one or more antiblock agents. The antiblock agents are preferably present in layer 1) in an amount of at least 0.07 wt %, more preferably between 0.07 wt % and 10 wt %, more preferably between 0.07 and 2 wt %, even more preferably between 0.07 and 0.5 wt % with respect to the total amount of propylene copolymers. Preferably, the antiblock agents are natural or synthetic silica.

Preferably, component a) of said composition of layer 1) comprises one or more slip agents. The slip agents are preferably present in an amount of at least 0.1 wt % preferably between 0.1 wt % and 10 wt %, more preferably between 0.1 and 2%, even more preferably between 0.1 and 0.5 wt % with the respect to the total amount of propylene copolymers. Preferably, the slip agent are oleamide and erucamide.

Preferably, component a) of said composition of layer 1) comprises both antiblock agents and slip agents.

Said ethylene alpha olefin copolymers of said composition of layer 1) are preferably ethylene ($C_4$-$C_{10}$) alpha olefin copolymers, more preferably ethylene octene copolymers and/or are selected from very low density polyethylene (VLDPE) or linear low density polyethylene (LLDPE) and mixtures thereof. Preferably, said ethylene alpha olefin copolymers are a mixture between very low density polyethylene and linear low density polyethylene, preferably in weight ratio among them comprised between 1.5:1 and 1:1.

A suitable VLDPE to be used in the present invention has a density preferably between 0.900 g/cc and 0.920 g/cc, more preferably of about 0.910 g/cc, such as for example the product commercialised under the tradename AFFINITY PL 1845G by Dow. A suitable LLDPE to be used in the present invention has a density preferably between 0.910 g/cc and 0.930 g/cc, more preferably of about 0.920 g/cc, such as for example the product commercialised under the tradename DOWLEX 2045S by Dow.

A suitable composition a) to be used in layer 1) of the film of the present invention is the product commercialized under the tradename ELTEX KS350 by Ineos.

Preferably, said layer 2) comprises at least 95 wt %, preferably at least 98wt %, more preferably at least 99 wt %, even more preferably 100 wt % of ethylene (meth)acrylate copolymers or anhydride modified ethylene alpha olefin copolymers.

Preferably, said ethylene (meth)acrylate copolymers of layer 2) are copolymers of ethylene with methyl acrylate, preferably containing between 15 and 30 wt %, more preferably 20 wt % or 24 wt % of methyl acrylate comonomer. A suitable ethylene methylacrylate copolymer to be used in the inner layer 2) of the film of the invention is for example the product commercialized under the tradename Elvaloy AC 12024S or Elvaloy 1820 AC by Du Pont or Lotryl Bestpeel 2012 by Arkema.

Preferably, in the composition of layer 2), said anhydride modified ethylene (meth)acrylate or anhydride modified (meth)acrylic acid copolymers are maleic anhydride modified ethylene (meth)acrylate or anhydride modified (meth)acrylic acid copolymers.

Preferably, said anhydride modified ethylene alpha olefin copolymers are anhydride modified ethylene ($C_4$-$C_{10}$) alpha olefin copolymers, more preferably anhydride modified ethylene octene copolymers and/or are anhydride modified linear low density polyethylenes. Preferably, said anhydride modified ethylene alpha olefin copolymers are maleic anhydride modified ethylene alpha olefin copolymers. More preferably, said anhydride modified ethylene alpha olefin copolymers are maleic anhydride modified linear low density polyethylenes.

A suitable maleic anhydride modified linear low density polyethylene for use in layer 2) of the film of the invention is for example the product commercialized under the tradename ADMER NF911E by Mitsui Chemical.

Preferably, in the film according to the invention, the outer layer of the film, opposite to the heat sealable layer 1), comprises at least 90 wt %, preferably at least 95 wt %, more preferably at least 98 wt %, even more preferably 100 wt % of polyesters.

Preferably, said polyesters are polyesters of aromatic dicarboxylic acids, more preferably of terephtalic acid.

Preferably said polyesters comprise at least 80 wt % of (semi)crystalline polyesters, preferably consist of an amount between 90 wt % and 100 wt %, preferably between 95 wt % and 99 wt %, even more preferably 98 wt % of (semi)crystalline polyesters and an amount between 0 and 10 wt %, more preferably between 1 and 5 wt %, even more preferably 2 wt % of amorphous polyesters.

Preferably, said polyesters are copolyesters, more preferably poly(ethylene terephthalate) copolymers.

Preferably, in order to improve the processing of the film in a high speed packaging equipment, slip and/or antiblocking additives may be added to above said outer layer of the film. These additives may be added in the form of a concentrate in a polyester carrier resin. The amount of carrier is typically in the order of 0.1-5% of the total weight of the layer.

According to one preferred embodiment of the present invention, the film has only three layers and layer 3) of the film is an outer layer of the film (outer layer 3), preferably having the preferred composition described above. According to an alternative preferred embodiment of the present invention, the film has more than 3 layers, preferably 4, layer 3 is an inner layer of the film (inner layer 3) and the outer layer of the film, opposite to the heat sealable layer, is a further polyester based layer of the film, in addition to layer 3), preferably having the preferred composition described above.

In a film according to this embodiment, layer 3) preferably comprises at least 90 wt %, preferably at least 95 wt %, more preferably at least 98 wt %, even more preferably 100 wt % of one or more polyesters. Preferably, said polyesters are polyesters of aromatic dicarboxylic acids, more preferably of terephtalic acid.

Preferably, said polyesters consist of an amount between 50 wt % and 100 wt % if (semi)crystalline polyesters and an amount between 0 and 50 wt % of amorphous polyesters.

Preferably, said polyesters are copolyesters, more preferably poly(ethylene terephthalate) copolymers.

According to a particularly preferred embodiment, layer 3) comprises an amount of at least 50 wt %, more preferably between 50 and 80 wt %, even more preferably between 55 wt % and 70 wt %, even more preferably about 60 wt % of (semi)crystalline polyesters and an amount between 20 and 50 wt %, more preferably between 30 and 45 wt %, even more preferably of about 40 wt % of amorphous polyesters.

A suitable amorphous copolyester for use in the inner layer 3) of the invention for example the product commercialized under the tradename GN001 by Eastman Chemical.

A suitable amorphous copolyester for use in the above outer layer of the film of the invention is for example the product commercialized under the tradename Sukano G dc S503 or TDC S497 by Sukano.

A suitable (semi)crystalline polyester for use in inner layers 3) or in the above outer layer of the film or in the inner layer 3) of the invention of the invention is for example the product commercialized under the tradename Ramapet N180 by Eastman Chemical or Poliprotect APB by Mossi & Ghisolfi.

The film according to the first object of the present invention may be manufactured according to processes well known in the art such as flat co-extrusion, optionally followed by mono- or bi-orientation, performed by flat, sequential or simultaneous tenterframe orientation.

Preferably, coextrusion is carried out by means well known in the art, for example using a flat or a circular film die that allows shaping the polymer melt into a flat tape or a film tubing, wherein each of the blends of the different layers of the film are extruded simultaneously through the extrusion die.

Optionally, the film of the present invention, co-extruded as described above, is then oriented through a flat film orientation process that produces a monoaxially, preferably biaxially oriented film by heating the tape to its softening temperature but below its melt temperature and by stretching in the solid state with a simultaneous or a sequential tenterframe process. The film is then rapidly cooled to somehow freeze the molecules of the film in their oriented state and wound. Preferably, orientation is carried out with a ratio comprised between about 2:1 and about 5:1, more preferably between 2:1 and about 4:1, even more preferably of 3.8:1 in each direction, Furthermore, it may be desirable to submit the oriented structure to a controlled heating-cooling treatment, so-called annealing, that is aimed at having a better control on low temperature dimensional stability of the film.

The film according to the present invention can also optionally comprise an antifog agent coated onto at least the surface of the heat sealable layer 1) of the film, which is directly facing the product in the container, so as to obtain an antifogging surface. Antifog agents for this application method are well known in the art. For example, they can be selected from non-ionic surfactants such as polyhydric alcohol fatty acid esters, higher fatty acid amines, higher fatty acid amides, polyoxyethylene ethers of higher fatty alcohols and ethylene oxide adducts of higher fatty acid amines or amides and the like.

The application of the antifogging agent to the film of the invention may be carried out either by in-line method involving application during the manufacture or by off-line method involving the application after the manufacture of the film. The antifogging agent may be added in an amount of from about 30 mg/sqm to 70 mg/sqm, preferably from about 40 mg/sqm to 60 mg/sqm, more preferably of 50 mg/sqm.

Preferably, the heat sealable layer surface of the film is corona treated before applying the coating.

The coating composition may be applied to the film by any suitable conventional technique, well known in the art, such as for example digital printing, roller printing, flexography, slot die, rotogravure, vapour deposition, or by blade, brush or scraper, or by spraying or pouring.

As will be demonstrated in the experimental section, films according to this embodiment when sealed onto polypropylene or polyethylene containers show very good hermeticity, antifog properties and are easily opened from the container. Furthermore, films according to this embodiment show particularly good optical properties. A second object of the present invention is a package comprising a container, preferably a tray, a product placed onto/into the container, and a lid made of the film according to the first object of the present invention hermetically sealed onto said container, thus enclosing the product, wherein the heat sealable layer of the film is in contact with or faces the product.

Examples of suitable supports for the package of the invention are container made of propylene or polyethylene or having a sealing area made of polypropylene or polyethylene, respectively.

The package is produced by techniques well known to those skilled in the art. The film of the invention is particularly suitable for use in inside-cut packaging methods. The film can also be used in outside cut packaging methods.

For example, once the food to be packaged has been placed in the container, the film according to the second object of the invention is sealed to the container, e.g. a tray, by means of temperature using conventional techniques and equipment.

In particular, the container with the product loaded therein is brought into a lid sealing station, which comprises a lower chamber and an upper chamber, and a web of the film of the invention is provided over the top of the container. The lower chamber and the upper chamber are then closed together, the air in-between the container and the lidding film is replaced by the suitable gas or gas admixture, with or without prior air evacuation, and then the lidding film of the invention is sealed to the rim or the peripheral lip of the container by means of the combination of a heated frame or platen above the lidding film and a similarly framed anvil supporting the container rim or peripheral lip, that are pressed together. In outside-cut packaging methods, the lidding film is cut almost at the same time as the lid is sealed. In case of shrinkable lids, shrinkage of the lid in the package typically occurs at the same time as the heat of the sealing elements in the lidding station is sufficient to get the desired shrinkage.

In inside-cut methods, the film is cut before application and sealing on the container.

Lidding machines that can be suitable for the lidding process include for instance Multivac 400 and Multivac T550 by Multivac Sep. GmbH, Mondini Trave, E380, E390 or E590 by Mondini S.p.A., Ross A20 or Ross S45 by Ross-Reiser, Meca-2002 or Meca-2003 by Mecaplastic, the tray lidding machines of Sealpac and the like machines.

As it will be demonstrated in the experimental section, the films of the present invention have the advantage that sealing at relatively low temperatures. In particular, the temperature necessary for hermetic sealing of the film to the support are generally between 130° C. and 150° C. and sealing times in the order of 0.5 to 1 second, preferably 0.5 to 1.0 second.

A third object of the present invention is the use of the film according to the first object of the invention for packaging food, preferably ready meals for cooking applications (either in microwave oven or in conventional oven), or moist or respiring products, such as fruits and vegetables or for packaging medical equipment.

EXAMPLES

The present invention can be further understood by reference to the following examples that are merely illustrative and are not to be interpreted as a limitation to the scope of the claims.

Example 1

Preparation of Films

In the following films, the polymers and compositions indicated in Table 1 below were used

TABLE 1

| Polymers and compositions | | |
|---|---|---|
| TRADENAME | SUPPLIER | ACRONYM |
| RAMAPET N180 | Indorama | PET1 |
| GN001 | Eastman Chemical | PETG1 |
| SUKANO G Dc S503 | Sukano | PETG2 |
| TDC S 497 | Sukano | PETG3 |
| ELTEX P KS350 | Ineos | EPC1 |
| AFFINITY PL 1845G | DOW | VLDPE1 |
| Elvaloy AC 12024S | DuPont | EMA1 |
| Lotryl Bestpeel 2012 | Arkema | EMA2 |
| Elvaloy 1820 AC | DuPont | EMA3 |
| ADMER NF911E | Mitsui Chemical | LLDPE-md1 |
| DOWLEX 2045S | DOW | LLDPE1 |
| Poliprotect APB | Mossi & Ghisolfi | Polyester |

PET1: Copolymer of terephtalic acid, isophtalic acid and mono ethylene glycol-Bulk (Apparent) Density 0.830 g/cc, Density 1.4 g/cc, Glass Transition 78° C., Melting point 245° C., Viscosity Solution 0.80 mPa · sec;
PETG1: Polyethylene Terephthalate/Glycol-Density 1.27 g/cc, Glass Transition 78° C., Viscosity Intrinsic 0.75 dl/g;
PETG2: Polyethylene Terephthalate/Glycol with amorphous silica and ester wax-Additives(SiO2) 10%, Additives(Wax) 6%, Bulk (Apparent) Density 0.74 g/cc, Density 1.4 g/cc, Vicat softening point 82° C.;
PETG3: Polyethylene Terephthalate/Glycol-Bulk (Apparent) Density 0.74 g/cc, Density 1.4 g/cc;
EPC1: Polypropylene copolymer, Propylene/Ethylene/Butene copolymer with anti-block and slip additives, Density 0.895 g/cc, Melt Flow Rate (230° C./02.16 kg) 5 g/10 min, Melting point 131° C., Vicat softening point 105° C.;
VLDPE1: Polyethylene, Very low density ethylene/octane copolymer-Density 0.91 g/cc, Melt Flow Rate (190° C./2.16 kg) 3.5 g/10 min, Melting point 103° C., Vicat softening point 95° C.;
EMA1: Copolymer of ethylene and methyl acrylate, 24% by weight methyl acrylate comonomer content, density 0.944 g/cc, Melt Flow Rate (190° C./2.16 kg) 20 g/10 min, Melting point 88° C.;
EMA2: Copolymer of ethylene and methyl acrylate, 20% by weight methyl acrylate comonomer content, Melt Flow Rate (190° C./2.16 kg) 11 g/10 min, Melting point 79° C.;
EMA3: Copolymer of ethylene and methyl acrylate with 20% methyl acrylate comonomer content, Density 0.942 g/cc, Melt Flow Rate (190° C./02.16 kg) 8 g/10 min, Melting Point 92° C., Vicat Softening Point 54° C.;
LLDPE-md1: Maleic anhydride modified polyethylene, Linear Low Density-Density 0.900 g/cc, Melt Flow Rate (190° C./2.16 kg) 2.5 g/10 min, Vicat softening point 74° C.;
LLDPE1: Polyethylene, Linear Low Density Ethylene/Octene Copolymer (linear, Ziegler/Natta)-Density 0.92 g/cc, Melt Flow Rate (190° C./02.16 kg).1.00 g/10 min, Melting point 124.0° C., Vicat softening point 103° C.;
Polyester: Polyethylene terephtalate copolymer with PA-Density 1.3 g/cc, Melting point 250° C., Viscosity Intrisic 0.85 dl/g;

Films 1-5 having the structure and composition set out in Table 2 were prepared.

TABLE 2

| Examples | | | | |
|---|---|---|---|---|
| Film n. | Layer | Layer composition | Layer thickness (μ) | Total thickness film (μ) |
| 1 | 1 | EPC1 35.00% VLDPE1 35.00% LLDPE1 30.00% | 6 | 40 |
| | 2 | LLDPE-md1 100.00% | 4 | |
| | 3 | PET1 60.00% PETG1 40.00% | 24 | |
| | 4 | PET1 98.00% PETG2 2.00% | 6 | |
| 2 | 1 | EPC1 35.00% VLDPE1 35.00% LLDPE1 30.00% | 6 | 40 |
| | 2 | EMA2 100.00% | 4 | |
| | 3 | PET1 60.00% PETG1 40.00% | 24 | |
| | 4 | PET1 98.00% PETG2 2.00% | 6 | |
| 3 | 1 | EPC1 35.00% VLDPE1 35.00% LLDPE1 30.00% | 6 | 40 |
| | 2 | EMA1 100.00% | 4 | |
| | 3 | PET1 60.00% PETG1 40.00% | 24 | |
| | 4 | PET1 98.00% PETG2 2.00% | 6 | |
| 4 | 1 | EPC1 35.00% VLDPE1 35.00% LLDPE1 30.00% | 6 | 33 |
| | 2 | EMA3 100.00% | 4 | |
| | 3 | Polyester 60.00% PETG1 40.00% | 19 | |
| | 4 | Polyester 98.00% PETG2 2.00% | 4 | |
| 5 | 1 | EPC1 100.00% | 6 | 33 |
| | 2 | EMA3 100.00% | 4 | |
| | 3 | Polyester 60.00% PETG1 40.00% | 19 | |
| | 4 | Polyester 98.00% PETG3 2.00% | 4 | |

All the above films were manufactured through a flat coextrusion process followed by in line simultaneous Teneterframe orientation using the following operative conditions:

MD ratio: 3.8:1
TD ratio: 3.8:1
Pre-heating temperature: 98° C.
Stretching temperature: 98° C.
Heat setting temperature: 158° C.

The film so obtained were cooled down first by an air flow at 30° C. and then by passing them onto a cooling roll that was cooled with water and kept at 20° C.

Example 2

Characterization of Films

Clarity and Haze

Haze of films 1 to 5 has been evaluated according to the standard test method ASTM D1003. The results of the test are reported in Table 3 below.

TABLE 3

| Haze | |
|---|---|
| Film N. | Haze (%) |
| Film 1 | 3 |
| Film 2 | 3 |
| Film 3 | 3 |

TABLE 3-continued

| Haze | |
| --- | --- |
| Film N. | Haze (%) |
| Film 4 | 3 |
| Film 5 | 3 |

As can be seen from the data above, all films according to the invention show excellent optical properties.

Example 3

Characterization of Films in Sealed Trays

The films prepared above were sealed at different sealing conditions reported in Tables 4 and 5 below onto EsPlastic mono PP black trays 1826-50, 450 micron thick, using a Sealpac A7 machine in cold room with either a 1826 OC (Outside Cut) tool with 2 different sealing bar profiles (flat 4 mm and convex 4 mm) or a 1826 IC (Inside Cut) tool with a flatbar profile. V/G setting was 300 mbar vacuum and 925 mbar gas.

The seals were clean, i.e. the films were sealed onto the tray keeping the tray flange under clean (i.e. non contaminated) conditions and no product was packaged.

As will be described in the examples below, hermeticity of the packages obtained and manual opening of packages were evaluated according to the test methods described below.

a. Hermeticity Test

The packages obtained were put in a closed water tank. Vacuum was created in the headspace of the water tank and recording was taken of the value of the pressure (in bars) inside the tank when bubbles start to escape from the closed packages. A number of packages were tested for each sealing.

The packages were considered to provide a hermetic seal fit for use when they had a Dopack value higher than 0.4. Packages with a Dopack value equal or lower to 0.4 were considered as not providing a hermetic seal.

Table 4 reports the results obtained in the test, wherein the Dopack value corresponds to the average pressure measured in mbars for each set of packages and the Dopack range indicates the lowest and highest pressure value measured in mbars obtained for each set of packages

TABLE 4

| | | | | Hermeticity | |
| --- | --- | --- | --- | --- | --- |
| Film | Sealing conditions | Seal bar | Packs tested | Dopack average | Dopack range |
| 1 | 120° C. for 0.8 sec | Flat OC | 12 | NA-Weak seal | NA-Weak seal |
| | | Convex OC | 12 | NA-Weak seal | NA-Weak seal |
| | 130° C. for 0.8 sec | Flat OC | 12 | 0.41 | 0.40-0.44 |
| | | Convex OC | 12 | 0.42 | 0.41-0.45 |
| | 140° C. for 0.5 sec | Flat OC | 12 | 0.48 | 0.44-0.52 |
| | | Convex OC | 12 | 0.48 | 0.45-0.52 |
| 2 | 120° C. for 0.8 sec | Flat OC | 12 | NA-Weak seal | NA-Weak seal |
| | | Convex OC | 12 | NA-Weak seal | NA-Weak seal |
| | 130° C. for 0.8 sec | Flat OC | 12 | 0.44 | 0.41-0.46 |
| | | Convex OC | 12 | 0.44 | 0.42-0.46 |
| | 140° C. for 0.5 sec | Flat OC | 12 | 0.47 | 0.46-0.48 |
| | | Convex OC | 12 | 0.48 | 0.46-0.50 |
| 3 | 120° C. for 0.8 sec | Flat OC | 12 | NA-Weak seal | NA-Weak seal |
| | | Convex OC | 12 | NA-Weak seal | NA-Weak seal |
| | 130° C. for 0.8 sec | Flat OC | 12 | NA-Weak seal | NA-Weak seal |
| | | Convex OC | 12 | 0.39 | 0.36-0.41 |
| | 140° C. for 0.5 sec | Flat OC | 12 | 0.47 | 0.42-0.52 |
| | | Convex OC | 12 | 0.49 | 0.43-0.53 |
| | 160° C. for 0.5 sec | Flat OC | 12 | 0.50 | 0.47-0.52 |
| | | Convex OC | 12 | 0.50 | 0.48-0.52 |
| 4 | 130° C. for 0.8 sec | Flat IC | 10 | 0.33 | 0.29-0.38 |
| | 140° C. for 0.8 sec | Flat IC | 10 | 0.45 | 0.39-0.50 |
| | 140° C. for 0.5 sec | Flat OC | 10 | 0.28 | 0.22-0.33 |
| | | Convex OC | 10 | 0.38 | 0.36-0.40 |
| | 160° C. for 0.5 sec | Flat IC | 10 | 0.5 | 0.39-0.54 |
| | 180° C. for 0.5 sec | Flat IC | 10 | 0.48 | 0.47-0.49 |
| | | Convex OC | 10 | 0.48 | 0.45-0.50 |
| 5 | 130° C. for 0.8 sec | Flat IC | 10 | NA-No seal | NA-No seal |
| | 140° C. for 0.8 sec | Flat IC | 10 | 0.42 | 0.40-0.45 |
| | 160° C. for 0.5 sec | Flat IC | 10 | 0.41 | 0.38-0.45 |
| | 180° C. for 0.5 sec | Flat IC | 10 | 0.43 | 0.42-0.45 |

NA: Not available b. Opening of the Packages

The quality of the opening of the packages obtained at the different sealing conditions indicated in Table 5 was manually tested by 2 panelists, opening at least 15 packs for each set of films.

The quality of the opening of the packages was recorded and the average outcome of the test classified according to the following parameters:
Peel:
Poor: −
Acceptable: +
Good: ++
Residue on Tray:
Present: +
Not present: −

TABLE 5

Opening of packages

| Film | Sealing conditions | Seal bar | Opening of packages Peel | Residue on tray |
|---|---|---|---|---|
| 1 | 130° C. for 0.8 sec | Flat OC | + | – |
|  |  | Convex OC | + | – |
|  | 140° C. for 0.5 sec | Flat OC | + | NA |
|  |  | Convex OC | + | NA |
|  | 160° C. for 0.5 sec | Flat OC | – | NA |
|  |  | Convex OC | – | NA |
| 2 | 130° C. for 0.8 sec | Flat OC | + | – |
|  |  | Convex OC | + | – |
|  | 140° C. for 0.5 sec | Flat OC | + | NA |
|  |  | Convex OC | + | NA |
|  | 160° C. for 0.5 sec | Flat OC | + | – |
|  |  | Convex OC | + | – |
| 3 | 130° C. for 0.8 sec | Flat OC | + | – |
|  |  | Convex OC | + | – |
|  | 140° C. for 0.5 sec | Flat OC | + | – |
|  |  | Convex OC | + | – |
|  | 160° C. for 0.5 sec | Flat OC | ++ | NA |
|  |  | Convex OC | ++ | NA |
| 4 | 130° C. for 0.8 sec | Flat OC | Weak seal-NA | Weak seal-NA |
|  | 140° C. for 0.8 sec | Flat IC | ++ | – |
|  | 160° C. for 0.5 sec | Flat IC | ++ | – |
| 5 | 140° C. for 0.8 sec | Flat IC | ++ | – |
|  | 160° C. for 0.5 sec | Flat IC | ++ | – |

NA: not available

As can be seen from the results above, in both inside cut and outside cut packaging, all the films of the invention show a good sealability and high hermeticity at low sealing temperatures combined with acceptable or good peelability, with no tearing.

The invention claimed is:

1. A heat sealable, coextruded multilayer film which is non heat shrinkable or is heat shrinkable and has a percentage of free shrink at 120° C. lower than 10% in longitudinal and/or transverse direction, measured in oil according to ASTM D 2732 and/or is biaxially oriented, with an orientation ratio between 2:1 and 5:1 in both longitudinal and transverse direction, the film comprising at least the following layers:
   1) an outer heat sealable layer comprising at least 90 wt % of a composition consisting of:
      a) between 20 and 100 wt % of one or more propylene copolymers and one or more antiblock agents and/or slip agents;
      b) between 0 and 80 wt % of one or more ethylene alpha olefin copolymers;
   2) an inner layer comprising at least 95 wt % of one or more polymers selected from ethylene (meth)acrylate or ethylene (meth)acrylic acid copolymers, anhydride modified ethylene (meth)acrylate or anhydride modified ethylene (meth)acrylic acid copolymers, anhydride modified ethylene alpha olefin copolymers and mixtures thereof,
   3) a polyester based layer;
   wherein layer 2) adheres to layer 1) and to layer 3).

2. A heat sealable film according to claim 1, having between 3 and 10 layers and/or having a total thickness between 3 and 150 microns and/or wherein the heat sealable layer 1) has a thickness comprised between 1 and 15 microns and/or layer 2) has a thickness comprised between 1 and 20 microns and/or layer 3) has a thickness comprised between 5 and 60 microns.

3. A heat sealable film according to claim 1, wherein said composition of layer 1) consists of one or more propylene copolymers and one or more antiblock agents and/or slip agents.

4. A heat sealable film according to claim 1, wherein said composition of layer 1) comprises an amount of between 25 and 99 wt % of one or more propylene copolymers and one or more antiblock agents and/or slip agents, and an amount between 1 and 80 wt % of one or more ethylene alpha olefin copolymers.

5. A heat sealable film according to claim 1, wherein said propylene copolymers of said composition of layer 1) are selected from copolymers of propylene with ethylene and/or butene, propylene/ethylene/butene copolymers and propylene/ethylene copolymers and mixtures thereof.

6. A heat sealable film according to claim 1, wherein layer 1) comprises one or more antiblock agents and one or more slip agents.

7. A heat sealable, coextruded multilayer film comprising at least the following layers:
   1) an outer heat sealable layer comprising at least 90 wt % of a composition consisting of:
      c) between 20 and 100 wt % of one or more propylene copolymers and one or more antiblock agents, wherein the antiblock agents are natural or synthetic silica and/or are present in layer 1) in an amount of at least 0.07 wt % with the respect to the total amount of propylene copolymers and/or slip agents, wherein the slip agent are oleamide and erucamide and/or are present in layer 1) in an amount between 0.1 wt % and 10 wt % with the respect to the total amount of propylene copolymers;
      d) between 0 and 80 wt% of one or more ethylene alpha olefin copolymers;
   2) an inner layer comprising at least 95 wt % of one or more polymers selected from ethylene (meth)acrylate or ethylene (meth)acrylic acid copolymers, anhydride modified ethylene (meth)acrylate or anhydride modified ethylene (meth)acrylic acid copolymers, anhydride modified ethylene alpha olefin copolymers and mixtures thereof,
   3) a polyester based layer,
   wherein layer 2) adheres to layer 1) and to layer 3).

8. A heat sealable film according to claim 1, wherein said ethylene alpha olefin copolymers of the composition of layer 1) are ethylene ($C_4$-$C_{10}$) alpha olefin copolymers, ethylene octene copolymers and/or are selected from very low density polyethylene or linear low density polyethylene and mixtures thereof, or a mixture between very low density polyethylene and linear low density polyethylene in weight ratio among them comprised between 1.5:1 and 1:1.

9. A heat sealable, coextruded multilayer film comprising at least the following layers:
   4) an outer heat sealable layer comprising at least 90 wt % of a composition consisting of:
      e) between 20 and 100 wt % of one or more propylene copolymers and one or more antiblock agents and/or slip agents;
      f) between 0 and 80 wt % of one or more ethylene alpha olefin copolymers;
   5) an inner layer comprising at least 95 wt % of one or more polymers selected from ethylene (meth)acrylate or ethylene (meth)acrylic acid copolymers. anhydride modified ethylene (meth)acrylate or anhydride modified ethylene (meth)acrylic acid copolymers, anhydride modified ethylene alpha olefin copolymers and mixtures thereof, 6) a polyester based layer;

wherein layer 2) adheres to layer 1) and to layer 3), and wherein said ethylene (meth)acrylate copolymers of layer 2) are copolymers of ethylene with methyl acrylate containing between 15 and 30 wt % of methyl acrylate comonomer and/or said anhydride modified ethylene alpha olefin copolymers of layer 2) are anhydride modified ethylene ($C_4$-$C_{10}$) alpha olefin copolymers, anhydride modified ethylene octene copolymers and/or anhydride modified linear low density polyethylenes and/or are maleic anhydride modified ethylene alpha olefin copolymers and/or, maleic anhydride modified linear low density polyethylenes.

10. A heat sealable film according to claim 1, wherein the outer layer of the film, opposite to the heat sealable layer 1), comprises at least 90 wt % of polyesters, the latter preferably comprising (semi)crystalline polyesters in an amount between 90 wt % and 100 wt between 1 and 5 wt %, of amorphous polyesters and/or said polyesters are copolyesters, poly(ethylene terephthalate) copolymers.

11. A heat sealable film according to claim 1, wherein the film has more than 3 layers, comprises at least 90 wt % of one or more polyesters consisting of an amount between 50 wt % and 100 wt % if (semi)crystalline polyesters and an amount between 0 and 50 wt % of amorphous polyesters and/or said polyesters are copolyesters, or poly(ethylene terephthalate) copolymers.

12. A heat sealable film according to claim 1, comprising an antifog agent coated onto at least the surface of the heat sealable layer 1) of the film.

* * * * *